United States Patent Office 2,920,641
Patented Jan. 12, 1960

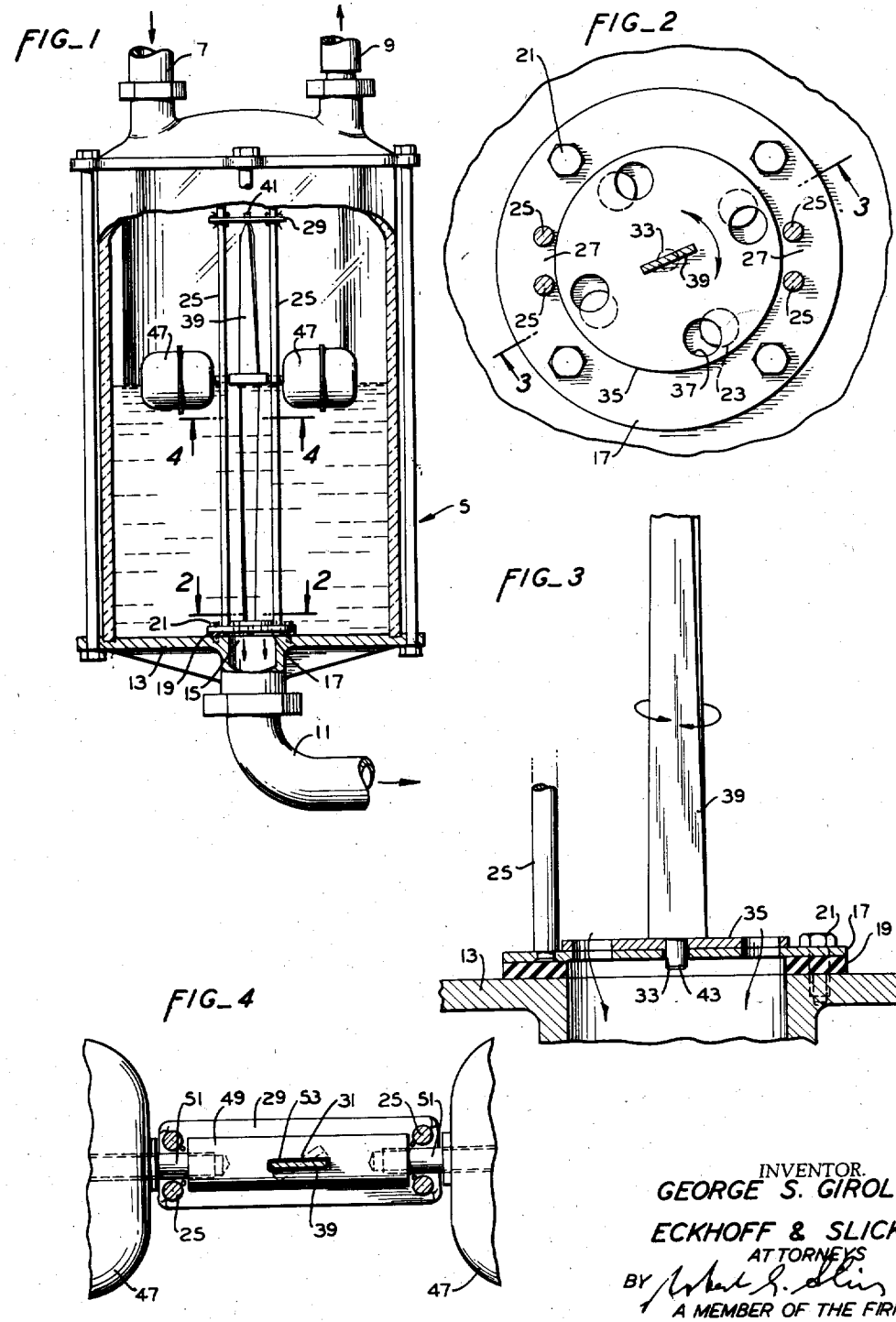

2,920,641

MILK RECEIVING JAR

George S. Girolo, Petaluma, Calif.

Application December 14, 1956, Serial No. 628,305

1 Claim. (Cl. 137—193)

This invention relates to milking machines and, more particularly, relates to a control valve for a milk receiving jar.

In mechanical milking systems, milk is delivered under vacuum to a milk receiving jar and is then drawn from the jar into a cooler, such as a surface cooler, or an aerator. It is quite obvious that the vacuum which draws the milk from the milk receiving jar must be at a higher vacuum than the balance of the milking system to withdraw the milk. This has given rise to various difficulties in the past since, when the milk receiving jar becomes empty, a small amount of milk will be left in the line from the milk receiving jar and air will then be drawn through this small amount of milk, subjecting the small amount of milk to agitation and frothing, which causes it to become rancid. Therefore, some means must be provided for shutting off the flow of milk from the milk receiving jar before it becomes completely empty.

Various atempts have been made to remedy this situation in the past, but none has proved to be completely satisfactory. If an ordinary ball check valve is used in the milk receiving jar, it will ordinarily stick at the bottom of the jar and stay submerged when the jar refills due to the relatively high vacuum which holds the ball down. Various mechanical valves have proved unsatisfactory since they shut the flow of milk on and off abruptly rather than providing a gentle throttling action. Another approach has been to control the vacuum in the line leading from the milk receiving jar by balancing the vacuum in such a manner that milk will be withdrawn only when the level of the milk has reached a certain height within the receiving jar. However, this has not proved satisfactory since it requires delicate control of the degree of vacuum and the controls on conventional milking machine equipment are not sufficiently sensitive to achieve the fine degree of control necessary.

It is an object of the present invention to provide a milk receiver with a valve which is positive in action and which will not stick in any position.

Another object of this invention is to provide a milk receiving jar with a valve which has a gentle throttling action so that a full flow will be achieved when the jar is filled, about half flow will be achieved when the jar is half filled and which will shut off the flow of milk before the jar becomes completely empty and wherein the valve will seek and maintain a balanced level depending upon rate of flow into the jar, thus avoiding surges in the flow of milk from the jar.

Still another object of this invention is to provide a milk receiving jar with a valve which does not require a delicate control of the vacuum used for withdrawing the milk.

In the drawings forming a part of this application:

Figure 1 is a side elevational view of a milk receiving jar, partly in section, showing the device of the present invention in place.

Figure 2 is an enlarged sectional view on the lines 2—2 of Figure 1.

Figure 3 is a sectional view on the lines 3—3 of Figure 2.

Figure 4 is an enlarged sectional view on the lines 4—4 of Figure 1.

Turning now to a description of the drawings by reference characters, there is shown a milk receiving jar, generally designated 5, of conventional form, having a milk receiving line 7 and a vacuum line 9 at the top thereof. The line 7 leads from a milking machine while the line 9 leads to the main vacuum line of a milking machine and it will be understood to those skilled in the art that the vacuum in line 9 is higher than the vacuum in line 7 so that the milk will flow into the jar 5 through the line 7. At the bottom of the jar is a line 11, which leads to a cooler, aerator, storage tank, or the like, and it will be understood that the vacuum in line 11 must be higher than the vacuum in either of lines 7 or 9 so that milk can be withdrawn from the jar. The jar thus described represents the prior practice in the art, and it is the small amount of milk which collects in the line 11 and which is subjected to frothing and agitation which gives rise to the need for the present invention.

Jar 5 has a bottom 13 with a central opening 15 therein, and in accordance with the present invention, a bottom plate 17 is secured to the bottom of the jar with a milk-tight gasket 19. The bottom plate 17 is held in place by suitable studs 21. The bottom plate 17 has a series of holes 23, which are preferably four in number, arranged in a circular configuration. The plate 17 supports four upstanding rods 25, which are arranged in pairs, so that each pair of rods has a narrow channel 27 between them. The tops of the rods 25 pass through a top plate 29, which has a central opening 31 therein, which serves as a bearing. The bottom plate 17 also has a central opening 33 therein, which serves as a similar bearing. Fitting tightly against bottom plate 17 is a smaller circular plate 35, which has openings 37 therein, generally corresponding to the openings 23 of the bottom plate. Rigidly fixed to the upper plate 35, as by welding, is a metal strap 39, which terminates in a reduced upper end portion 41, which passes through the opening 31. The member 39 is slightly twisted through about one-fourth revolution for its entire length. The bottom plate 35 has a stud 43 thereon, so that the member 39 can pivot in the two bearing supports 33 and 31, bringing the holes 23 and 37 into or out of alignment, depending upon the position of the member 39, and, in turn, the upper plate 35. Two floats 47 are provided within the milk receiving jar, the two floats being connected to a central member 49, by means of the rods 51. The rods 51 pass through the guideways 27 formed by each pair of the rods 25 and so the floats can float up and down in the milk, but are prevented from turning from side to side by means of the guides. The central member 49 has a rectangular central opening 53 therein through which the member 39 passes. Thus, as the floats move up and down, the member 39 is rotated thus bringing the openings 23 and 37 into and out of alignment. When the floats are at the top of the jar, the openings are fully in alignment, while the openings are completely out of alignment when the floats approach the bottom of the jar. Of course, intermediate positions of the floats produce intermediate degrees of openings between the holes 23 and 37. In this manner, a very delicate control is established and the floats will automatically establish a level wherein milk is withdrawn from the jar at about the rate it enters so there will be no possibility of drawing air through milk in the bottom of the jar or in the line 11.

I claim:

A milk receiving jar having an opening for the receiving of milk, a vacuum line for transporting milk into the jar and a bottom opening for removing milk from the jar by applying a vacuum thereto, a valve at the bottom of the jar, said valve consisting of a stationary apertured plate fixed over said bottom opening and a second apertured plate rotatably mounted over said first mentioned plate, the apertures in said plates being so arranged that certain of them may be made to coincide whereby to allow for removal of the contents of said milk receiving jar, a spiral strap fixedly secured to the uppermost of said aforementioned plates extending upwardly therefrom and journaled at the opposite end thereof in a fixed member near the top of said milk receiving jar, a pair of floats slideably mounted on opposite sides of said spiral strap within said jar for motion longitudinally of said strap, said floats being mounted on a support member therefor having a rectangular opening therein through which said metal strap extends, and means for preventing rotary movement of said floats, said means comprising a pair of upright guides fixed within said jar, said floats being positioned one on each side of said paired guides and said support member for said floats passing between said paired guides, said pair of floats being so arranged relative to said spiral strap that the apertures in said plates are aligned when said float is in an uppermost position and the apertures in said plates are misaligned when said float is in a lowermost position.

References Cited in the file of this patent

UNITED STATES PATENTS

| | | |
|---|---|---|
| 1,014,766 | Lytton | Jan. 16, 1912 |
| 1,150,342 | Cogswell | Aug. 17, 1915 |
| 1,467,137 | Curran | Sept. 4, 1923 |
| 2,383,507 | Martin | Aug. 28, 1945 |
| 2,586,619 | Davis | Feb. 19, 1952 |
| 2,715,413 | Bold | Aug. 16, 1955 |

FOREIGN PATENTS

| | | |
|---|---|---|
| 26,149 | Great Britain | Nov. 27, 1902 |
| 545,660 | Germany | Mar. 14, 1932 |
| 115,816 | Australia | Sept. 2, 1942 |